United States Patent

Rainer

[15] 3,674,683

[45] July 4, 1972

[54] PROCESS FOR THE REMOVAL OF OIL FROM THE SURFACE OF A BODY OF WATER

[72] Inventor: Norman B. Rainer, Richmond, Va.

[73] Assignee: Philip Morris Incorporated, New York, N.Y.

[22] Filed: Jan. 2, 1970

[21] Appl. No.: 420

[52] U.S. Cl. .................................210/40, 210/DIG. 21
[51] Int. Cl. ..................................................E02b 15/04
[58] Field of Search..............................210/36, 40, DIG. 21

[56] References Cited

UNITED STATES PATENTS

| 3,494,862 | 2/1970 | Horowitz | 210/40 |
| 3,518,183 | 6/1970 | Evans | 210/40 |

FOREIGN PATENTS OR APPLICATIONS

| 979,978 | 1/1965 | Great Britain | 210/DIG. 21 |

Primary Examiner—Samih N. Zaharna
Attorney—Watson, Leavenworth & Kelton

[57] ABSTRACT

This disclosure relates to a process for removal of oil from the surface of a body of water, wherein a material comprising a particulate microporous hydrophobic vinyl chloride polymer, such as polyvinyl chloride, is applied to the oil.

2 Claims, No Drawings

PROCESS FOR THE REMOVAL OF OIL FROM THE SURFACE OF A BODY OF WATER

The present invention relates to the treatment and removal of oil from the surface of a body of water and, more particularly, to a material useful in absorbing oil from a water surface and to a method for removing oil floating on a body of water.

It is known that ocean and inland water may become polluted by accidental or purposeful spillage or discharge of oil into a body of water, the oil usually forming a surface layer or film on the water. The presence of such an oil layer or film may present a fire hazard and may threaten marine and plant life in the water as well as on adjoining land areas washed by the water. In addition, oil coming from oil tankers, off-shore drilling operations and the like, may make beaches unusable and may foul boats, fish, nets and the like. The present invention provides a means for removing or limiting the spread of the oil and, if desired, for recovering the oil from the water.

Prior to the present invention, attempts have been made to handle oil spills, such as crude oil spilled from a tanker vessel during transit, by the use of various dispersants and absorbents. The dispersants have generally been found to be unpredictable or of doubtful effectiveness. The absorbents which have heretofore been employed have been substances such as clay, sawdust, straw, etc., which are wetted by water as well as oil, and once wetted by water lose their absorptive affinity for oil.

It has also been suggested that the oil can be removed by the use of congealing agents, such as oil-in-water emulsion-forming soaps and paraffin wax, in order to form a stiff gel or mass. Synthetic non-oil resisting rubber latex, such as styrene-butadiene, polybutadiene and butyl rubber, has been suggested for use to absorb oil, whereby the latex is applied to the oil and coagulation of the latex and sorbed oil is effected. It has also been known to employ oleo specific absorbents, such as silicone-coated expanded perlite and hydrophobic powders having minute particle size and porous surface structure capable of adsorbing oil substantially to the exclusion of water and which can be scooped out or caused to sink to the bottom of the body of water. Materials, such as clay and sand, have been used in conjunction with other materials, such as carbon and olefin polymers, to remove oil from water. However, none of the aforementioned materials or techniques have been wholly satisfactory.

It is an object of the present invention to provide a process for alleviating the effects of oil spilled into a large body of water and for minimizing the spread of oil on the surface of a body of water.

It is another object of the present invention to provide a process for removing oil from admixture with water.

It is a further object of the invention to provide a composition useful in absorbing and collecting oil which is floating on a body of water.

According to the present invention, a process is provided for treating and removing oil from the surface of a body of water, whereby a material which is absorbed by the oil but not wet by water is applied to the oil on the surface of the water to coagulate and collect the oil in a form in which it can readily be removed from the surface of the water. The essential element of the material comprises a hydrophobic vinyl chloride polymer having a microporous open matrix formed of a hydrophobic vinyl chloride polymer. The vinyl chloride polymer preferably floats on water and preferably has an average pore diameter of from about 5 to 80 microns. In addition, the polymer is preferably employed in the form of particles having an average particle diameter of from about 0.1 mm. to about 3.0 mm., corresponding to the U. S. Bureau of Standards sieve numbers 140 and 60

The vinyl chloride polymer of the present invention may be employed with a secondary substance to modify the bulk density of the microporous material and to reduce cost, said secondary substance preferably having an average particle size of less than 50 microns, most preferably of 10 microns or below, being insoluble in the vinyl chloride polymer and being surrounded by and/or dispersed in, as an essentially discontinuous phase, the vinyl chloride polymer, which should be an external, essentially continuous, phase. The resulting material should preferably float on water and have an average particle diameter of from about 0.1 mm. to about 3.0 mm.

After it has been applied to the oil on the surface of a body of water, the material employed in accordance with the present invention is absorbed into the oil thereby thickening the oil to a semi-solid form which can be collected and removed by mechanical means or, if desired, caused to sink to the bottom of the body of water. The oil-absorptive composition of the present invention is not wetted by water. When spread over the general area of an oil spill it floats on the water surface and is attracted to the oil substrate whereby it is absorbed into the oil and thickens it without destroying flora and fauna. The material is of low cost and is highly efficient in performance.

Particles having an average pore diameter below 5 microns are found to entrap air while absorbing oil, and thus display reduced absorptive capacity. Particles having an average pore diameter above 80 microns have a tendency to be wetted by water, i.e., adsorb or be absorbed by water and thereby lose the special selective characteristic which imparts high efficiency to the composition of this invention. Therefore, the average pore diameter of the microporous structure employed in the present process should preferably not exceed about 80 microns nor be less than about 5 microns.

The geometric relationship between the pore structure and solid content of the materials employed in the process of the present invention is preferably such that the microporous structure contains at least about 1.8 cc. of pore volume per gram, and preferably at least about 2.3 cc. of pore volume per gram.

The porous vinyl chloride polymer particles may comprise polyvinyl chloride or may be copolymers of vinyl chloride with a second vinyl-type monomer. Said copolymers should contain at least 50 percent vinyl chloride and should preferably contain at least 70 percent of vinyl chloride. Illustrative of such copolymers are copolymers of vinyl chloride and vinyl acetate, copolymers of vinyl chloride and propylene, copolymers of vinyl chloride and alkyl esters of maleic acid, or a terpolymer prepared from three monomers or compatible blends, such as blends of polyvinyl chloride and polymers of esters of acrylic and methacrylic acids or may be such other material which will perform the functions set forth in greater detail in this specification. Preferably the vinyl chloride is combined with no more than 30 percent of a comonomer.

The porous vinyl chloride polymer of this invention may be made by a process which involves formation of a fluid comprising a dispersion of polyvinyl chloride particles in a substantially inert liquid and, optionally, secondary particulate materials, placing the composition in a mold or the like, and solidifying the composition. Solidification may be achieved by means such as solvent removal, cooling from an elevated temperature, resin curing by virtue of cross-linking or oxidation, the adhering or sintering together of fine particles, coprecipitation, chemical transformations, coagulative phenomena, and still other means. The microporous configuration may be formed by means such as incorporation of gas or vapor bubbles within the still fluid composition; incorporation of particles within the composition which, after solidification can be removed by leaching or roasting; coagulating, precipitating, or sintering a composition containing a liquid which serves to space apart the solidifying components; mechanically disrupting (e.g., with sonic energy) a weakly cohesive gel, followed by hardening of the gel; treatment of polymer structures with chemical agents which induce crack formation; and other related methods.

The vinyl chloride polymer or resin may be made into a microporous structure by being blended, either alone or with the secondary material, with an organic liquid which is a non-solvent for the resin and heating the resulting mixture to a temperature at which the resin fuses, while maintaining the mixture under sufficient pressure to maintain the non-solvent at least partially in the liquid phase, whereby the resin particles fuse together forming an interconnected network of open spaces due to the presence of the non-solvent which fills the spaces. Decalin (decahydronaphthalene) may be employed as the non-solvent. Glycols such as ethylene glycol, propylene glycol and glycerine have been found to be particularly effective non-solvent. After the resin particles have fused, the non-solvent is removed from the pores of the material. A preferred method for removing the non-solvent is to contact the non-solvent-containing resin with water. The resulting material may then be cut or ground to the proper size and employed in the process of the present invention.

The vinyl chloride polymer may be combined with up to 80 percent by weight of a secondary, not necessarily hydrophobic, material in the formation of the microporous structure. Such materials are preferably low cost, finely divided particulate solid ingredients which may be dispersed in or surrounded by the hydrophobic material, and include for example: clays, such as kaolin and bentonite, carbon blacks, sands, mineral ores, such as limestone and iron pyrite, slags, gangues, recovered dusts and filtration fines, diatomaceous earth, powdered glasses, and the like. The secondary substance preferably has an average particle size below 50 microns and more preferably below 10 microns. It is insoluble in the hydrophobic substance, but adheres well thereto, and is mixed therewith prior to formation of the microporous structure.

The oil substrate congealed by the microporous particulate composition is generally lighter than water and will float thereon in a form which can be readily collected by nets, screens, rakes, or analogous methods. Even where the congealed oil is not removed from the water, it is in a form Which is less harmful to flora and fauna than the untreated oil film.

It is important, in the embodiments of the present invention containing secondary particulate materials, that the hydrophobic material surround the secondary particulate ingredient, the preferred embodiment being that wherein the hydrophobic material is essentially an external continuous phase with the secondary particulate ingredient dispersed therein as a discontinuous phase. However, the continuous hydrophobic phase may be present in small amounts, serving merely as a binder or coating for the secondary ingredient.

Application of the particulate microporous material of the present invention to the region of an oil spill in a body of water may be made via aircraft, or via blowers on board boats, or on shore or dock installations, or by any means designed to effect dusting of the composition over the spill region.

The following examples are illustrative:

EXAMPLE 1

A dispersion is prepared by mixing in a Waring blendor 40 parts polyvinyl chloride power of 0.2 micron particle size, 10 parts refined kaolin clay of 18 micron average particle size, 50 parts dioctyl phthalate, and 200 parts decalin. The mixture is placed in a sealed Carius tube and placed in an oven at 163°C. for 45 minutes whereupon the mixture sinters to form a microporous structure. The structure is extracted with isopropanol, which removes decalin and dioctyl phthalate. The material is dried, powdered, and sieved to obtain a product which passes through a 40 mesh screen and is retained by an 80 mesh screen.

The powder is employed in treating crude petroleum oil spilled onto a body of salt water, by blowing the powder over the area of the spill. The powder which initially impinges upon water floats on the surface until it is absorbed by the pools and droplets of floating oil. The non-wetted floating particles of microporous material are in fact drawn to the oil substrate and are absorbed therein to form a stiff semi-solid floating mass which resists further absorption of floating microporous particles. The semi-solid oil masses are collected by use of 40 mesh screens which are dragged with the use of pontoon floats across the surface of the water. It is found that the collected oil mass consists of 25 percent by weight of the microporous material, the remainder being the crude petroleum oil.

EXAMPLE 2

A mixture is prepared consisting of 38 parts finely divided iron pyrite ore of 4.8 specific gravity, having an average particle size of 20 microns, 12 parts polyvinyl chloride of 0.2 micron average particle size, 30 parts dioctyl phthalate, and 60 parts decalin. The mixture is ball milled until a thick, barely pourable consistency is obtained. The mixture is then diluted with 60 additional parts decalin and placed in horizontally positioned cylindrical molds of 1 ½ inch diameter so as to fill half the volume of the molds. The molds are placed in an air circulating oven at 163°C. for 45 minutes. Upon cooling, the composition solidifies to a sintered microporous structure. The material is washed with ethanol to remove all decalin and dioctyl phthalate, dried, powdered in a Waring blendor, and sieved to obtain particles of 30–60 mesh size. The microporous structure of the composition has an average pore diameter of 12 microns and a pore volume of 2.3 cc. per gram, as determined by measurement on a mercury porosimeter. The calculated specific gravity of the composition from which the microporous structure is made is 3.1.

In a test simulating the spillage of crude oil onto river water, crude petroleum oil is floated in a reservoir of fresh water, and the microporous particulate material of this example is sprinkled over the area of the spill. The oil absorbs the particulate microporous material and, when saturated with the microporous material, congeals to a semi-solid mass which sinks to the bottom of the reservoir.

EXAMPLE 3

15.8 g. of powdered resin comprising a vinyl chloride/dibutyl maleate copolymer in a ratio of approximately 80/20 and having an average particle size of 1 to 2 microns and a bulk density (packed) of 31 pounds per cubic foot and a specific gravity of 1.39, and 6.8 g. of talcum powder were mixed into 127.5 g. of propylene glycol by high speed stirring in a Waring blendor, followed by 16 hours of ball milling. The dispersion was deaerated at reduced pressure and poured into a three-quarter inch diameter Carius tube which was sealed and heated in an oven at 165°C. for 60 minutes. The cooled tube contained a rod 3 inches shorter than the initial dispersion, and clear exuded liquid. The rod of microreticulated polymer was diced and water washed. Isopropanol extraction for 6 hours and air drying followed by dry grinding and sieving to −40 +80 mesh gave an oil-absorbing powder. Ash analysis showed 22 percent talc content; when wet grinding was employed, the talc content was only 9.3 percent.

EXAMPLE 4

174 g. of glycerine was slowly added to 46.4 g. of latex of a copolymer of 80 parts by weight of vinyl chloride and about 20 vinyl acetate. The dispersion was dehydrated by vacuum treatment at 45°C. and 0.5 mm. Hg. The total solids content after dehydration was 13 percent. The dispersion was poured into a 1 inch I.D. Carius tube and the tube was capped with a vented cap. The tube was placed horizontally in an air-circulating oven and maintained at a temperature of 160°C. After 60 minutes, the tube was removed and allowed to cool to room temperature. During heating, the dispersion had sintered to form an integral microporous rod which had shrunk approximately 1 inch in length to a length of 16.5 inches. The rod had a very uniform structure. The rod was cut into wafers approximately one-quarter inch thick which were washed in tap water to remove the glycerine. The wafers were then wet ground in water in a Waring blendor and wet sieved to −40 +80 mesh. The particles on the 80 mesh screen were dried and resieved to −40 +80 mesh. The −40 +80 mesh particles were found to float on water and when contacted with oil floating on water, their oil absorption ratio was 5.0 grams of oil per gram of −40 +80 mesh material. After absorption of the oil, the resulting material remained floating, with no tendency towards sinking.

I claim:

1. A process for treating and removing oil from the surface of a body of water comprising dusting microporous particles of a vinyl chloride polymer over an oil slick on a body of water, said particles having an average diameter of from about 0.1 mm. to about 3.0 mm., with pores of about 5 to 80 microns in diameter, the microporous structure of the particles having a pore volume of at least 1.8 cc. per gram, and absorbing said oil from the surface of water into said porous polymeric particles.

2. The process of claim 1, wherein the microporous particles used consist essentially of −40 +80 mesh powder.

* * * * *

UNITED STATES PATENT OFFICE
CERTIFICATE OF CORRECTION

Patent No. 3,674,683        Dated August 29, 1972

Inventor(s) Norman B. Rainer

It is certified that error appears in the above-identified patent and that said Letters Patent are hereby corrected as shown below:

Column 1, line 68, "60" should read --6.--.
Column 4, line 54, "20 vinyl acetate" should read --20 parts of vinyl acetate--.

Signed and sealed this 2nd day of January 1973.

(SEAL)
Attest:

EDWARD M. FLETCHER, JR.        ROBERT GOTTSCHALK
Attesting Officer               Commissioner of Patents